April 6, 1943. C. D. CANTRELL, JR 2,315,590
CORING APPARATUS
Filed July 14, 1941 2 Sheets-Sheet 1

INVENTOR
CYRUS D. CANTRELL JR.
BY
Hudson, Young, Shanley & Yinger
ATTORNEY

Patented Apr. 6, 1943

2,315,590

UNITED STATES PATENT OFFICE 2,315,590

CORING APPARATUS

Cyrus D. Cantrell, Jr., Bartlesville, Okla., assignor to Phillips Petroleum Company, a corporation of Delaware Application July 14, 1941, Serial No. 402,406

10 Claims. (Cl. 255—72)

This invention relates to coring, and more particularly to apparatus for obtaining representative cores from subsurface formations.

It is common practice in the petroleum industry to obtain cores from hydrocarbon-bearing formations for the purpose of determining certain reservoir characteristics which are useful in predicting reservoir fluid performance. Virgin reservoirs may be cored usually with a relatively high percentage of core recovery. Depleted formations at shallow depths may be cored with equal success. On the other hand, coring depleted reservoirs at greater depths yields a relatively low percentage of core recovery. In the present practice of coring, a drilling fluid is usually circulated downwardly through the drill pipe and thence upwardly through the annular space between the bore hole and the drill pipe to the surface of the ground where entrained formation cuttings are removed from the drilling fluid. As greater depths of formation are cored, the pressure of the drilling fluid column increases proportionately. In coring depleted formations in comparatively deep wells, the pressure of the column of drilling fluid may become so great that the fluid and entrained formation cuttings will flow into the porous formation where the solid materials and the drilling fluid will plug off the pore spaces of the formation instead of circulating to the surface of the ground. If an unconsolidated formation is cored, drilling fluid under considerable pressure may wash away certain portions of the core so that that which remains is non-representative of the formation cored. If a consolidated formation is cored, the drilling fluid may penetrate the core, contaminating the formation fluid therein. Non-representative or contaminated cores have little or no value for analytical interpretation.

By the practice of my invention I am able to obtain representative formation cores, which are not contaminated by drilling fluid. The invention is especially useful in coring low-pressure and non-consolidated formations, as I do not employ a high pressure drilling fluid in the operation of my apparatus. Further, I employ a positive acting means for retaining a core within a core barrel, which insures my obtaining a representative core.

The primary object of my invention is to provide an apparatus for obtaining cores from subsurface formations.

Another object of my invention is to provide an apparatus for obtaining representative cores from low pressure and non-consolidated formations.

These and additional objects and advantages will be apparent to persons skilled in the art by reference to the following description and annexed drawings, wherein Figure 1 is an elevation view of my invention partly in cross-section;

Figure 1:
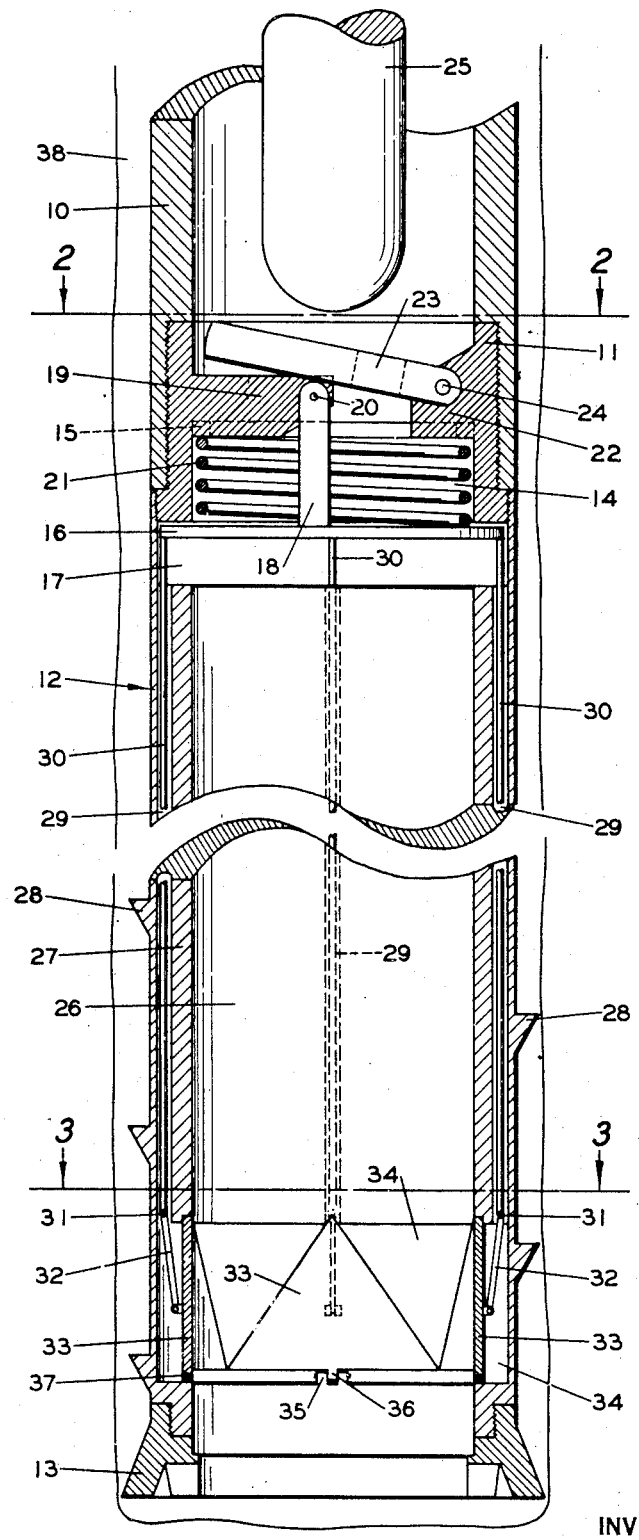
Figure 2:
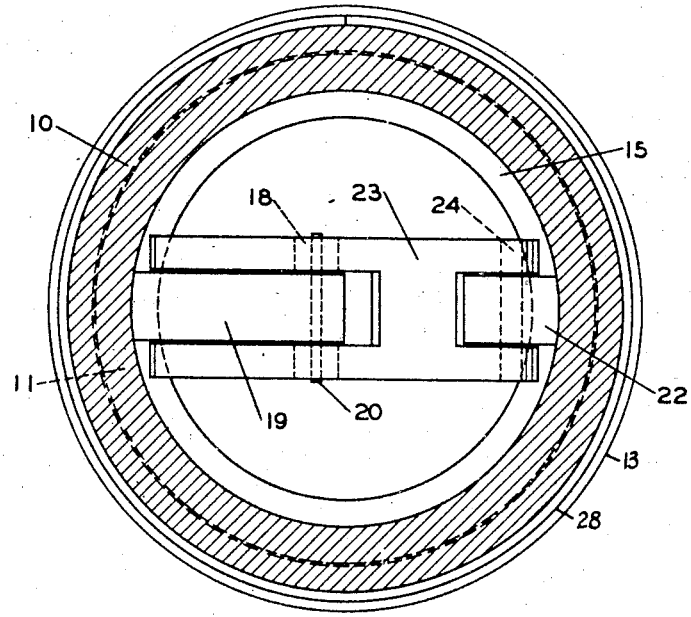
Figure 2 is a sectional view taken along line 2—2 of Figure 1.

Referring to the drawings and more particularly to Figures 1 and 2, I have denoted therein a string of rotary drill pipe by reference numeral 10. The drill pipe is threadedly connected at the bottom to a member 11, which in turn is threaded to connect with the upper end of a core barrel 12. The lower end of the core barrel is adapted to receive a bit 13. A spring chamber 14 is formed in the lower portion of member 11 between the under side of a flange 15 and the top of a slidable plate 16, which moves vertically through a space 17 in the upper portion of core barrel 12. A pair of spaced elements 18 is welded or otherwise secured to the upper surface of plate 16 and is adapted on upward vertical movement of the plate to receive an arm 19 which is provided on member 11. It will be noted that elements 18 and arm 19 are horizontally bored to accommodate a removable shear pin 20, which may be inserted through the elements and the arm to maintain plate 16 in a fixed position against the action of a compression spring 21, which may be of any desired strength. A second arm 22 is provided in member 11 diametrically opposite to arm 19. A tripping yoke 23 is pivotally mounted on arm 22 by means of a pin 24. When the device is assembled, as shown in Figure 1, yoke 23 rests upon the top of elements 18 and is in a position to receive the full impact of a "go-devil" or weight 25, which may be dropped into the drill pipe from the surface of the ground for the purpose of shearing pin 20 and thereby releasing plate 16 from a fixed position.

Figure 3:
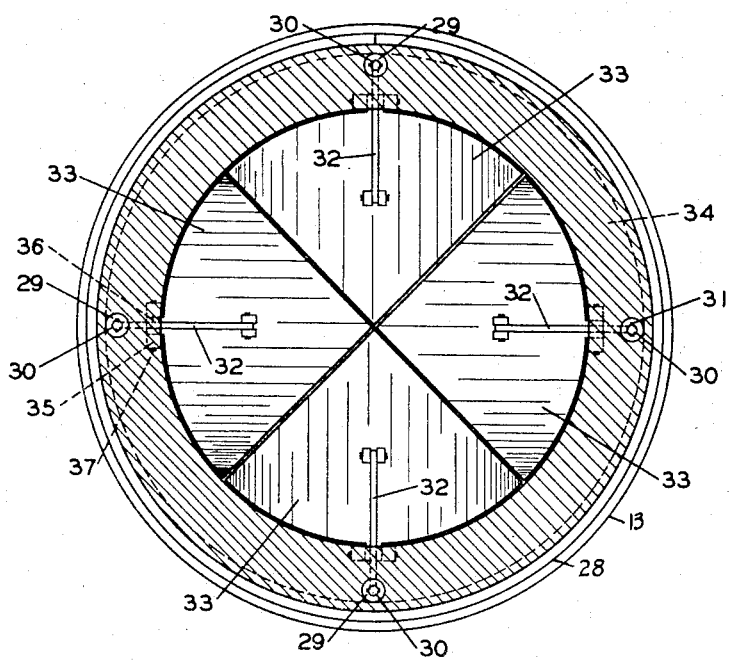
Figure 3 is a sectional view taken along line 3—3 of Figure 1, showing the dogs in a closed position.

In addition to space 17, core barrel 12 contains a core-receiving chamber 26 which is formed by the internal surface of a cylindrical member 27. Core barrel 12 is also provided with a spiral rib 28 which is formed on the external surface of cylinder 27. A plurality of vertical bores 29 are provided in cylinder 27 to accommodate a plurality of slidable rods 30 which are secured at the top to plate 16 in such a manner that the rods may be readily removed from the plate, if desired. Rods 30 are connected at the bottom by pins 31 to links 32 which in turn are pivotally attached to core retainers or dogs 33. The retainers are urged inwardly upon the downward movement of rods 30 to close off chamber 26, as shown in Figure 3. A recess 34 is formed in cylinder 27 into which retainers 33 are withdrawn when my device is in a set position, as shown in Figure 1. Thus, chamber 26 is cleared of any obstruction which would impede the obtaining of a formation core. Pairs of spaced arms 35 are provided on the base of recess 34. These arms are spaced apart to receive a third arm 36, which is formed on each retainer 33. Arms 35 and 36 are bored on the same diameter, and a suitable pivot pin 37 is inserted therethrough, attaching the retainer to cylinder 27 with a hinged-type of connection. It will be noted that a well bore, in which my device is adapted for use, has been indicated by reference numeral 38.

In operation, my device is assembled in the manner illustrated in Figure 1 and lowered into well bore 38 by drill pipe 10 in a manner well known in the art. When the core barrel has been lowered to the bottom of the well bore, a very small amount of water may be placed in the bottom of the bore hole in order to cool and lubricate bit 13. My device is then rotated in the usual manner, causing bit 13 to cut a core from the formation. The cuttings of the formation which are formed by the bit in obtaining a core are urged upwardly away from the bit along the outside of the core barrel by spiral rib 28. When the desired length of core has been cut, go-devil 25 is dropped into the drill pipe at the surface of the ground. The go-devil travels downwardly through the drill pipe until it strikes yoke 23. The impact of the go-devil is transmitted through yoke 23 to elements 18, causing pin 20 to shear and releasing compression spring 21. With pin 20 sheared, spring 21 urges plate 16 and rods 30 downwardly. Rods 30 cause links 32 to force retainers 33 out of recess 34 into chamber 26 where the retainers engage the formation core. In event the core is a loose or non-consolidated sand, the retainers will be forced to assume the position illustrated in Figure 3. In this position, the retainers completely close chamber 26 and will prevent the loss of the core from chamber 26. On the other hand, if the formation core is hard and consolidated, the retainers may not completely close, but may only grasp the core with sufficient strength to prevent the core's being lost from the core chamber when my device is withdrawn from the well bore.

From the foregoing, it is believed that the operation and advantages of the apparatus for practicing my instant invention will be readily comprehended by persons skilled in the art. It is to be clearly understood, however, that various changes in the apparatus shown and described may be resorted to without departing from the spirit of the invention, as defined by the appended claims.

I claim:

1. In coring apparatus of the character described, the combination comprising a tubular member, core drill means secured to the tubular member and having a central opening communicating with the interior thereof, a plurality of core retainer elements pivotally supported in the tubular member, said elements being so constructed and arranged as to form a closure across the tubular member when in fully protracted position, releasable means for maintaining the retainer elements in retracted position in the tubular member, and means for operating the releasable means to thereby urge the retainer elements into protracted position.

2. In coring apparatus of the character described, the combination comprising a tubular member, core drill means secured to the tubular member and having a central opening communicating with the interior thereof, a plurality of core retainer elements pivotally supported in the tubular member, a plunger for each retainer element, a link pivotally connected to each plunger and a corresponding retainer element, releasable means cooperating with the plungers to maintain the retainer elements in retracted position in the tubular member, and means for operating the releasable means to thereby urge the retainer elements into protracted position.

3. In coring apparatus of the character described, the combination comprising a tubular member, core drill means secured to the tubular member and having a central opening communicating with the interior thereof, a plurality of core retainer elements pivotally supported in the tubular member, said elements being so constructed and arranged as to form a closure across the tubular member when in fully protracted position, a plunger for each retainer element, a link pivotally connected to each plunger and a corresponding retainer element, releasable means cooperating with the plungers to maintain the retainer elements in retracted position in the tubular member, and means for operating the releasable means to thereby urge the retainer elements into protracted position.

4. In coring apparatus of the character described, the combination comprising a tubular member, core drill means secured to the tubular member and having a central opening communicating with the interior thereof, a plurality of core retaining dogs pivotally supported in the tubular member, a plunger for each dog, a link pivotally connected to each plunger and a corresponding dog, spring means for normally actuating the plungers to urge the dogs into protracted position, releasable means cooperating with the plungers to maintain the dogs in retracted position in the tubular member, said releasable means including an element attached to the plungers and movable within predetermined limits in the tubular member, an arm in the tubular member, a connector projecting upwardly of the element, and shearable means for securing the connector to the arm, and means for severing the shearable means to permit the spring means to urge the dogs into protracted position.

5. In coring apparatus of the character described, the combination comprising a tubular member, core drill means secured to the tubular member and having a central opening communicating with the interior thereof, a plurality of core retaining dogs pivotally supported in the tubular member, said dogs being so constructed and arranged as to form a closure across the tubular member when in fully protracted position, a plunger for each dog, a link pivotally connected to each plunger and a corresponding dog, spring means for normally actuating the plungers to urge the dogs into protracted position, releasable means cooperating with the plungers to maintain the dogs in retracted position in the tubular member, said releasable means including an element attached to the plungers and movable within predetermined limits in the tubular member, an arm in the tubular member, a connector projecting upwardly of the element, and shearable means for securing the connector to the arm, and means for severing the shearable means to permit the spring means to urge the dogs into protracted position.

6. Core taking apparatus comprising a drill stem, a core barrel attached to the stem, a core drill secured to the lower end of the barrel and having a central opening communicating with the interior thereof, a plurality of core retainer elements pivotally supported in the barrel, said elements being so constructed and arranged as to form a closure across the barrel when in fully protracted position, releasable means for maintaining the retainer elements in retracted position in the barrel, and means including a device adapted to be lowered through the stem for operating the releasable means to thereby urge the retainer elements into protracted position.

7. Core taking apparatus comprising a drill stem, a core barrel attached to the stem, a core drill secured to the lower end of the barrel and having a central opening communicating with the interior thereof, a plurality of core retainer elements pivotally supported in the barrel, a plunger for each retainer element, a link pivotally connected to each plunger and a corresponding retainer element, releasable means cooperating with the plungers to maintain the retainer elements in retracted position in the barrel, and means including a device adapted to be lowered through the stem for operating the releasable means to thereby urge the retainer elements into protracted position.

8. Core taking apparatus comprising a drill stem, a core barrel attached to the stem, a core drill secured to the lower end of the barrel and having a central opening communicating with the interior thereof, a plurality of core retainer elements pivotally supported in the barrel, said elements being so constructed and arranged as to form a closure across the barrel when in fully protracted position, a plunger for each retainer element, a link pivotally connected to each plunger and a corresponding retainer element, releasable means cooperating with the plungers to maintain the retainer elements in retracted position in the barrel, and means including a device adapted to be lowered through the stem for operating the releasable means to thereby urge the retainer elements into protracted position.

9. Core taking apparatus comprising a drill stem, a core barrel attached to the stem, a core drill secured to the lower end of the barrel and having a central opening communicating with the interior thereof, a plurality of core retaining dogs pivotally supported in the barrel, a plunger for each dog, a link pivotally connected to each plunger and a corresponding dog, spring means for normally actuating the plungers to urge the dogs into protracted position, releasable means cooperating with the plungers to maintain the dogs in retracted position in the barrel, said releasable means including an element attached to the plungers and movable within predetermined limits in the barrel, an arm in the tubular member, a connector projecting upwardly of the element, and shearable means for securing the connector to the arm, and means including a device adapted to be lowered through the stem for severing the shearable means to permit the spring means to urge the dogs into protracted position.

10. Core taking apparatus comprising a drill stem, a core barrel attached to the stem, a core drill secured to the lower end of the barrel and having a central opening communicating with the interior thereof, a plurality of core retaining dogs pivotally supported in the barrel, said dogs being so constructed and arranged as to form a closure across the lower portion of the barrel when in fully protracted position, a plunger for each dog, a link pivotally connected to each plunger and a corresponding dog, spring means for normally actuating the plungers to urge the dogs into protracted position, releasable means cooperating with the plungers to maintain the dogs in retracted position in the barrel, said releasable means including an element attached to the plungers and movable within predetermined limits in the barrel, an arm in the tubular member, a connector projecting upwardly of the element, and shearable means for securing the connector to the arm, and means including a device adapted to be lowered through the stem for severing the shearable means to permit the spring means to urge the dogs into protracted position.

CYRUS D. CANTRELL, Jr.